J. E. HODSON.
COMBINED COOKING AND COMMINUTING OR PRESSING UTENSIL.
APPLICATION FILED MAR. 25, 1915.
1,184,239.
Patented May 23, 1916.
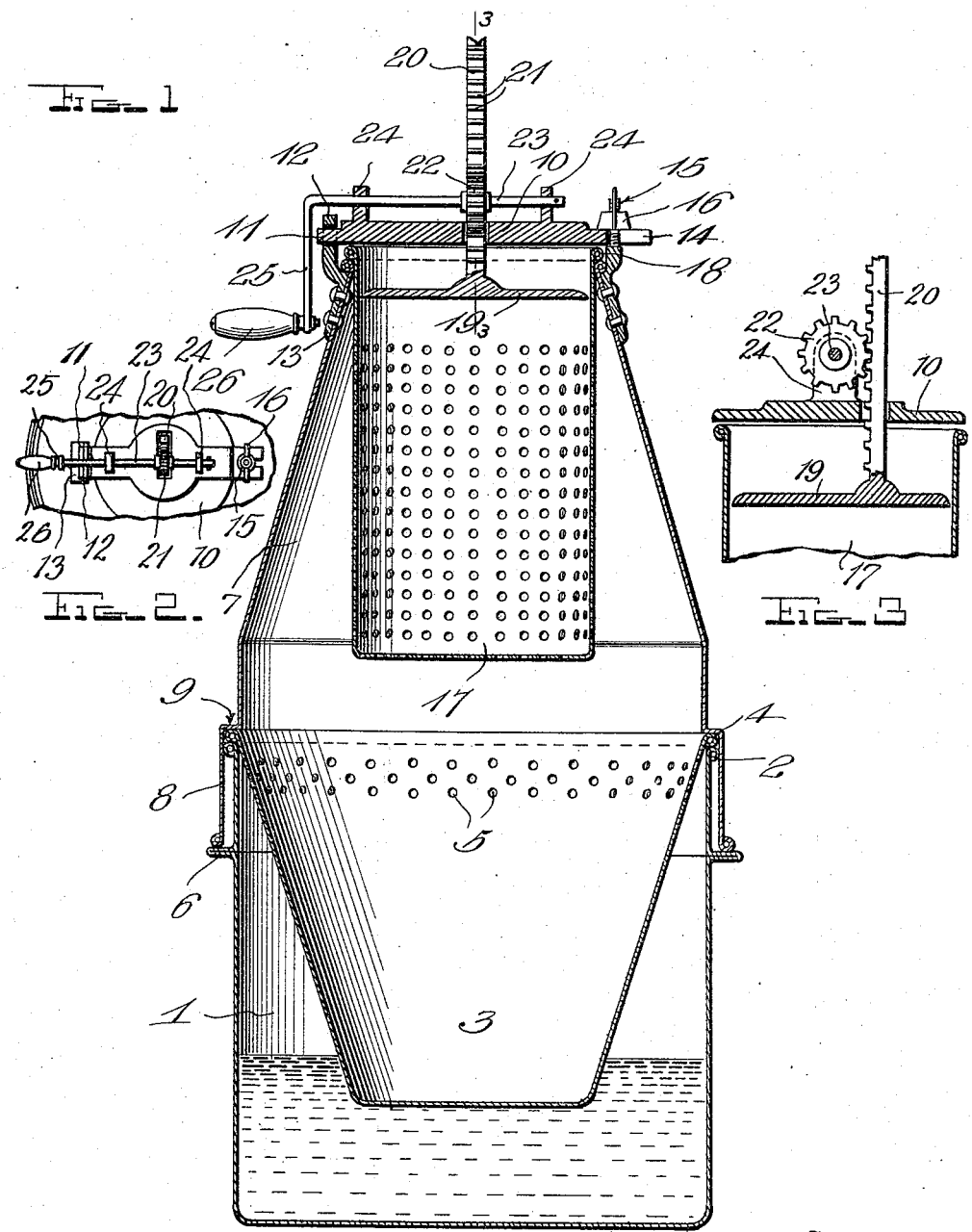
Witnesses
E. Clemena
E. D. Haines.
Inventor
James E. Hodson
by H. B. Willson & Co
Attorneys

UNITED STATES PATENT OFFICE.

JAMES ELVEN HODSON, OF VERNAL, UTAH.

COMBINED COOKING AND COMMINUTING OR PRESSING UTENSIL.

1,184,239.  Specification of Letters Patent.  Patented May 23, 1916.

Application filed March 25, 1915. Serial No. 16,926.

*To all whom it may concern:*

Be it known that I, JAMES ELVEN HODSON, a citizen of the United States, residing at Vernal, in the county of Uinta and State of Utah, have invented certain new and useful Improvements in Combined Cooking and Comminuting or Pressing Utensils; and I do declare the following to be a full, clear, and exact description of the invention, such as will enable others skilled in the art to which it appertains to make and use the same.

This invention relates to culinary apparatus and more particularly to improvements in a combined steam cooker and comminuting or pressing utensil.

The primary object of the invention is to provide a utensil of this character which may be used for cooking vegetables, fruit and other articles and after they are cooked it may be employed to mash them and keep them hot until ready for use.

Another object is to provide a utensil of this character which may be used either for a cooking and mashing apparatus or for both and is especially applicable for cooking and mashing potatoes and like vegetables or fruit, or for pressing out the juices from fruit preparatory to making syrup, jellies and the like.

With these and other objects in view the invention consists of certain novel features of construction, and the combination and arrangement of parts as will be more fully described and claimed.

In the accompanying drawings: Figure 1 represents a longitudinal vertical central section of a cooking utensil constructed in accordance with this invention. Fig. 2 is a detail top plan view thereof. Fig. 3 is a fragmentary sectional view taken on the line 3—3 of Fig. 1.

In the embodiment illustrated an upright cylindrical vessel 1 is shown of uniform diameter throughout although not necessarily so and which is provided at its upper end with an outturned laterally extending flange or bead 2 to form a support for an inner vessel 3 which is here shown hopper shaped with the side walls thereof converging toward its lower end and said lower end being spaced some distance from the bottom of the receptacle 1 when the parts are connected. This vessel 3 is provided at its upper end with a laterally extending flange or bead 4 which is designed to rest on the flange 2 of the receptacle 1 for removably supporting the vessel 3 in operative position within the receptacle 1. This vessel 3 is provided at its upper end around the periphery thereof with a plurality of perforations 5 which are designed to permit the passage of steam from the receptacle 1 into the upper portion of the vessel 3 from which it rises into the upper chamber of said utensil which will presently be described. The receptacle 1 is provided near its upper end with a bead 6 which extends circumferentially therearound and is designed to form a stop for the overlapping flange of a hollow upper member or section 7 of the utensil. This member 7 is here shown of a height substantially equal to the height of the receptacle 1 but not necessarily so and is open at its lower end and closed at its upper end, by a removable closure 10 which will be hereinafter more fully described, the open lower end thereof being provided with an offset annular flange 8 which is designed to fit over and closely engage the upper end of the receptacle 1 with its edge abutting the bead 6 on said receptacle to form a steam tight connection between the two members. The offset portion 9 of said member 7 rests on the upper edge or flange 4 of the vessel 3 as is shown clearly in Fig. 3. This member 7 may be of any suitable or desired shape but is here shown with the side walls thereof converging for a portion of their length. The closure for member 7 as shown comprises a lid 10 having a lug extending laterally from one edge thereof and which is designed to fit into a bearing 12 carried by the upper end of the member 7 at one side thereof, said bearing 12 being here shown offset outwardly from the side walls of the members 7 and connected thereto by straps or arms 13 which are riveted to the walls of the member 7. This lid 10 is provided at the side opposite the lug carrying side with a laterally extending slotted lug 14 which is designed to receive an upwardly projecting threaded stud 15 fixed to the upper end of the member 7 at the side diametrically opposite to the bearing side thereof. This stud after being inserted through the slot in the lug 14 is provided with a wing nut 16 which is adapted to be tightened on said stud for securely clamping the cover 10 in operative position on the member 7.

A perforated vessel 17 is shown supported in the upper member 7 of the utensil and as shown is cylindrical in form with its entire area perforated to provide for the discharge therefrom of the material to be comminuted therein. This vessel 17 is shown provided at its upper end with a laterally extending flange 18 which rests on the upper edge of the member 7 and thereby supports said vessel 17 removably within the member 7.

A plunger 19 corresponding in shape to the cross sectional contour of the vessel 17 is mounted to reciprocate in said vessel and is provided with an upwardly projecting rod or bar 20 which is provided throughout its length with a plurality of rack teeth 21 which are designed to mesh with a cog wheel 22 carried by a horizontally disposed shaft 23 revolubly mounted in suitable journals or bearings 24 on the outer face of the closure 10. This shaft 23 is in the form of a crank shaft and the crank portion 25 thereof is provided with an actuating handle 26 for the purpose of rotating said shaft and causing the cog wheel 22 carried thereby and which is normally in mesh with the rack teeth of the piston or plunger rod 20, to reciprocate said rod and thus move the plunger 19 either up or down in the vessel 17 according to the direction in which said crank shaft is turned.

The walls of the vessel 17 are spaced from the walls of the member 7 to permit the free passage between them of steam which is generated in the receptacle 1 and passes up through the perforations in the top of the vessel 3 into the member 7 of the utensil and enters said vessel 17 through the perforations therein and thus cooks any vegetables or other articles which may be contained in said vessel.

In the use of this improved utensil the receptacle 1 is first partially filled with water as shown in Fig. 1 and the vessel 3 is then supported therein by engaging its flange 4 with the flange 2 of said receptacle 1 and when so disposed, potatoes or other articles to be cooked may be placed within said vessel 3. The cover member or upper section 7 is then placed in operative position on the receptacle 1 with the flange 8 thereof fitting around the upper end of said receptacle 1 and closely engaging it to prevent the passage of steam between the joint thereby formed. After this member 7 has been so positioned the perforated vessel 17 is placed within said member and supported in operative relation therein by engaging the flange 18 thereof with the upper end of said member 7. Then potatoes or other articles to be cooked may be placed in this vessel 17. The plunger 19 is then inserted in the vessel 17 and the top 10 placed over said vessel and engaged with the member 7, said top having a central aperture therein for receiving and guiding the racked rod 20 of the plunger. After this top has been properly connected with the member 7 by first engaging the lug 11 thereof with the bearing 12 of said member and placing the threaded stud 15 through the slotted ear or lug 14 of said top 10, the wing nut 16 is engaged with said stud and said top thereby reliably clamped in operative position on the member 7. The utensil may then be placed on a stove or over a suitable flame for heating the water contained in the receptacle 1 and may be there retained until sufficient steam has been generated in the receptacle 1 and passed up through the perforations 5 in the vessel 3 into the chamber 7 above, where it surrounds and enters the perforated vessel 17 and thus steams and cooks the contents of said vessel.

After the contents of this utensil have been properly cooked they may be removed and used if desired without any further treatment, or the contents of the receptacle 3 may be first removed by disengaging the member 7 from the receptacle 1 and removing vessel 3 from which its contents may be readily lifted. This vessel 3 is then again replaced in the receptacle 1 and the member 7 engaged with said receptacle 1 in operative position. Then on the turning of the handle 26 in the proper direction the crank shaft 23 will be rotated to cause the plunger 19 through its engagement with the cog wheel 22 on said shaft 23 to be forcibly moved downwardly into the vessel 17 and thereby compress and thoroughly comminute the contents of said vessel by forcing it out through the perforations therein. The crushed and comminuted contents of the vessel 17 will pass therefrom into the receptacle 3 disposed below it and may be retained therein and kept hot until desired for use.

From the above description it will be obvious that this utensil may be quickly set up for use and after use may be readily disassembled for cleaning and other purposes.

While the utensil has been described especially for cooking and mashing potatoes, it is obvious that it may be used for many other purposes, such for instance as cooking and mashing apples, for compressing the juices from fruit when it is desired to make jellies, syrups and the like, and after the juices have been so compressed and fall into the receptacle 3, they may be retained therein and cooked to the proper consistency if desired by the heat generated in said receptacle by the heat of the water.

I claim as my invention—

1. The combination of a water containing receptacle, a vessel removably supported therein with its side walls spaced from the walls of said receptacle and perforated at their upper ends, a hollow member engaged with the upper end of said receptacle, a perforated vessel supported in said hollow member, a closure for said perforated vessel, a plunger mounted to reciprocate in said perforated vessel and having a rod extending through its closure, and coöperating means mounted on said member and on said rod for reciprocating said rod to move said plunger back and forth in the perforated vessel.

2. The combination of a receptacle closed at one end and open at its other and provided at its open end with a laterally extending flange, a vessel removably supported in said receptacle and having its side walls converging toward its lower end, said walls being perforated at their upper end, an upper section removably engaged with said receptacle and having a removable closure at its upper end, a perforated vessel removably mounted in said upper section, a plunger mounted to reciprocate in said perforated vessel, a rod connected with said plunger and mounted to slide in an aperture in said closure, said rod being provided throughout its length with rack teeth, a crank shaft revolubly mounted on the outer face of said closure and having a cog wheel fixed thereto and meshing with the teeth of said rod, and means for operating said crank shaft whereby said plunger is reciprocated within said perforated vessel.

3. A combined cooking and comminuting utensil comprising two longitudinally alined members telescopically engaged at one end, a vessel mounted in each of said members and spaced from the side walls of said members and from each other, the vessel in said lower member having apertures in its upper end and the vessel in said upper member being perforated throughout its entire area, a plunger mounted in the vessel in said upper member, a closure for said upper member, a rod carried by said plunger and slidably mounted in said closure, and a crank shaft revolubly mounted on said closure and having means for engaging said rod for raising and lowering the plunger.

4. A combined cooking and comminuting utensil comprising two hollow members telescopically engaged at one end, means for limiting the telescoping movement of said members relatively to each other, the lower member being closed at its other end, a vessel removably mounted in the lower member and provided at its upper end with apertures, the upper member having upwardly converging side walls and provided at opposite sides with an eye and threaded stud respectively, a closure for said member having a lug for engagement with said eye and a slot for the reception of said stud, a wing nut for clamping engagement with said stud, a plunger mounted in the vessel disposed in said upper member, and means for reciprocating said plunger in said vessel.

5. A combined cooking and comminuting utensil comprising an upright cylindrical receptacle having a laterally extending flange at its upper end, a vessel removably mounted in said receptacle and having a laterally extending flange at its upper end resting on the flange of said receptacle, the side walls of said vessel converging toward its lower end, a hollow section or member having an offset annular flange for engaging the upper end of said vessel, the walls of said member converging upwardly and provided at their upper end with a laterally extending flange, a cylindrical perforated vessel mounted in said member and having a laterally extending flange at its upper end resting on the flange of said hollow member, a cover removably engaged with the upper end of said hollow member, a plunger mounted in said perforated vessel, and means for reciprocating said plunger in said vessel.

In testimony whereof I have hereunto set my hand in presence of two subscribing witnesses.

JAMES ELVEN HODSON.

Witnesses:
 PETER HARRISON,
 A. E. MARSHALL.

Copies of this patent may be obtained for five cents each, by addressing the "Commissioner of Patents, Washington, D. C."